Patented Feb. 1, 1927.

1,616,353

UNITED STATES PATENT OFFICE.

ERNEST B. COBB, OF JERSEY CITY, NEW JERSEY, ASSIGNOR TO STANDARD DEVELOPMENT COMPANY, A CORPORATION OF DELAWARE.

MANUFACTURE OF REFINED OILS.

No Drawing. Original application filed April 8, 1922, Serial No. 550,865. Divided and this application filed February 24, 1926. Serial No. 90,415.

The present invention relates to the manufacture of refined oils and more particularly of refined viscous oils such as lubricating oils, water white or medicinal oils and the like.

In the refining of such oils, the stock, which is in general a distillate or cut obtained from crude oil after the kerosene or burning oil cut has been removed, is subjected to an acid treatment with strong sulfuric acid, for example, with 66° Bé. acid or fuming acid. The treatment with sulfuric acid may be heavy or light; that is, with greater or less amounts of acid, in accordance with the extent to which the refining of the oil is to be carried. The action of the acid upon the hydrocarbons of the oil appears to form, among other compounds, sulfo-compounds, which are in part dissolved in the sludge which is settled out of the oil, and are in part retained in the oil.

The proportion and the specific characteristics of the sulfo-compounds retained in the oil vary to some extent with the character of oil treated and with the nature of the treatment. Thus, in a light acid treatment with 66° Bé. acid for the production of lubricating oils, a less proportion of these compounds appears to be formed than in the heavy acid treatments with fuming acid employed in the case of the manufacture of white oils or medicinal oils. The character of the oil appears to influence to a marked degree the ease of removal of the retained sulfo-compounds.

In accordance with the present invention, the oil to be refined is subjected to the desired acid treatment which may be with 66° acid or fuming acid and in one or a plurality of dumps. The sludge is removed from the treated oil as completely as possible by settling, and, if equipment permits, it is desirable that this settling be continued for two or three days or even longer.

After the last acid treatment and removal of acid sludge, the oil is neutralized, for example with caustic soda solution. This neutralization is an important step in the process; it serves to fix the sulfo-compounds, rendering them involatile when the oil is distilled. This distillation is preferably made with fire and steam to a 5 to 10% bottom. The alkali sludge is removed before the oil is distilled. The distilled oil is then given a light treatment with fuming sulfuric acid and allowed to settle. The sludge is removed and the sour oil is then heated to a temperature between 350° and 500° F., and preferably at about 380° F. In order to carry off the volatile products formed, it is found desirable to pass steam through the oil during the heat treatment, the steam being also effective in agitating the oil to cause uniform heating thereof and in removing any volatile oil or gas present, which is not desired in the final product. During the heat treatment acidity of the oil decreases and it becomes substantially neutral and will not tarnish copper at the end of the treatment.

The heating is continued for a period sufficient to place the oil in the condition just described. This period will vary, but for most purposes it will be fifteen hours or longer. A heating period of twenty hours is often found best. During the heating, the elementary sulfur, sulfur combinations and unstable compounds combine or decompose, with the formation of some volatile and some non-volatile and otherwise more stable products.

As mentioned above, the steam serves to carry off the volatile products formed.

The removal of non-volatile products of decomposition of the sulfo-compounds and other undesirable bodies caused by the heat treatment from the oil, if they are not excessively large in amount, may be effected by filtration of the oil through fuller's earth or Florida clay. When the proportion of decomposition products formed is so large, or they are of such character that filtration through Florida clay alone is not wholly effective or is uneconomical, the colloidal products of decomposition may be in whole or in part coagulated and removed by washing with acid, preferably sulfuric acid of 66° Bé. or weaker. After this washing, the oil having been thoroughly settled.

its refining may be completed by direct filtration through fuller's earth.

The following examples illustrate the practice of the present invention:

*Example No. 1.*

In preparing a medicinal oil from West Columbia or Coastal stock, which appears to contain both naphthenic and asphaltic compounds, a suitable distillate is selected, for example one having a viscosity of 450 seconds Saybolt at 100° F., a gravity of about 22° Bé. and a flash point of 370° F. This stock is treated with fuming sulfuric acid containing 20% anhydride, a suitable proportion being 37% by volume. The treatment is preferably effected in five dumps of approximately equal proportions. After each dump the oil is settled, suitably from twenty-four to forty-eight hours, and the sludge removed. Before each dump the oil is preferably cooled to below 70° F. After the last treatment, the sludge is drawn off and the batch is neutralized, for example, with 12° Bé. caustic soda solution. The alkali sludge is removed and the oil may then, if desired, be blown with air at about 180° to 200° F. This air blowing removes water. After neutralization the oil is distilled with fire and steam to a bottom of 5 to 10%, the distillate being collected as a whole, with the exception of the light constituents which might undesirably reduce the flash point of the product. This distillation, as described in my Patent No. 1,388,517, granted August 23, 1921, leaves the sulfo-compounds in the form of their sodium salts or soaps in the residue, the distillate being substantially free therefrom.

The distillate may be chilled or pressed to remove wax, if desired, and is treated again with a small proportion of the fuming acid. A suitable proportion is 15% by volume, the treatment being preferably carried out in two dumps of approximately equal proportions. After this acid treatment the oil is allowed to settle for as long a period as possible, two or three days at least. The sour oil is then subjected to the heat treatment above described, being heated preferably to 380° to 410° F. for about twenty hours, with the injection of steam to effect the removal of volatile decomposition products and sulphur dioxide. At the end of the heat treatment the oil is cooled and filtered through fuller's earth, the preliminary coagulation of suspended matter with acid as described above being desirable but not usually necessary in this case. The finished oil has a viscosity of 200 to 210 seconds Saybolt at 100° and a gravity of about 29° Bé.

*Example No. 2.*

A distillate from a Coastal crude, having a gravity of 22.3° Bé., a flash point of 325° F., a viscosity of 125 seconds Saybolt at 100° F., and a zero cold test, is treated for the production of a white medicinal oil in the manner described in Example No. 1 above, except that the pressing of the distillate from the oil after the first acid treatment is unnecessary and the heat treatment or steaming of the oil after the second acid treatment is carried out at about 380° F. The finished oil is water white, and has a gravity of 29.8° Bé., a flash point of 325° F., a viscosity of 105 seconds Saybolt at 100° F. and a 10° F. cold test. A distillate of this character may be similarly treated, a vigorous treatment with fuming acid being followed by a heat treatment in the manner described for the removal of sulfo-compounds, and this, in turn, by a light acid treatment and filtration.

Although the present invention has been described in connection with the details of specific methods for carrying it into effect, it is not intended that these shall be regarded as limitations upon the scope of the invention, except in so far as retained in the accompanying claims.

The present application is a division of my copending application Serial No. 550,865, filed April 8, 1922.

I claim:

1. The process of refining heavy distillates, which comprises treating such distillates with a large amount of fuming sulfuric acid, neutralizing the acid treated oil, distilling the oil with fire and steam to a 5 to 10% bottom, collecting the distillate, retreating the distillate with a less proportion of fuming sulfuric acid, heating the resulting sour oil to about 350–500° F. while passing steam therethrough, continuing the heating and steaming until the oil becomes substantially neutral and will not tarnish copper, and filtering the oil.

2. The process according to claim 1, in which the fire and steam distillate is treated for the removal of wax before the second acid treatment.

3. The process according to claim 1, in which the distillate is selected from stocks of the type of West Columbia or Coastal oil, said distillate having a viscosity of about 450 seconds Saybolt at 100° F. and a gravity of about 22° Bé.

4. The process of refining heavy distillates, which comprises subjecting such distillates to heavy acid treatment with fuming sulfuric acid, neutralizing the acid treated oil, distilling the oil with fire and steam to a 5 to 10% bottom, collecting the distillate, retreating the distillate with a less proportion of fuming sulfuric acid, heating the resulting sour oil to about 380° F. for eighteen to twenty hours while passing steam therethrough, and filtering the oil.

5. The process of refining heavy distillates, which comprises subjecting such distillates to heavy acid treatment with fuming sulfuric acid in a plurality of stages, removing the sludge formed after each acid treatment, neutralizing the oil, removing the sludge formed by the neutralization, distilling the neutralized oil with fire and steam to a bottom of 5 to 10%, collecting the distillate as a whole with the exception of light constituents, removing wax from the distillate, then treating the distillate with a small proportion of fuming acid, removing sludge, subjecting the residual sour oil to heat treatment at about 380° to 410° F. for about twenty hours with the injection of steam, and cooling and filtering the oil.

ERNEST B. COBB.